(12) United States Patent
Nguyen (10) Patent No.: US 11,098,821 B1
(45) Date of Patent: Aug. 24, 2021

(54) FLAPPER VALVE

(71) Applicant: Cantex International, Inc., Houston, TX (US)

(72) Inventor: Duy D. Nguyen, Cypress, TX (US)

(73) Assignee: Cantex International, Inc., Houston, TX (US)

( * ) Notice: Subject to any disclaimer, the term of this patent is extended or adjusted under 35 U.S.C. 154(b) by 80 days.

(21) Appl. No.: 16/598,388

(22) Filed: Oct. 10, 2019

(51) Int. Cl.
*F16K 31/528* (2006.01)
*F16K 15/03* (2006.01)

(52) U.S. Cl.
CPC .......... *F16K 31/5282* (2013.01); *F16K 15/03* (2013.01); *Y10T 137/7898* (2015.04)

(58) Field of Classification Search
CPC ................. F16K 31/5282; F16K 15/03; Y10T 137/7898–7902
USPC ................................................ 251/298–303
See application file for complete search history.

(56) References Cited

U.S. PATENT DOCUMENTS

| | | | | |
|---|---|---|---|---|
| 274,222 A | * | 3/1883 | Pfau ........................ | F16K 15/03 137/527.2 |
| 362,651 A | | 5/1887 | Neary | |
| 1,325,568 A | | 12/1919 | Leidecker | |
| 1,577,637 A | | 3/1926 | Hess | |
| 1,635,842 A | * | 7/1927 | Hirshstein ............... | F16K 15/03 137/527.2 |
| 2,358,101 A | * | 9/1944 | Merwyn ................. | F16K 17/16 137/70 |
| 2,589,176 A | * | 3/1952 | Wheatley ................ | F16K 15/03 137/269.5 |
| 2,637,264 A | | 5/1953 | Harmon | |
| 2,928,416 A | * | 3/1960 | Balhouse ................ | F16K 15/03 137/527.8 |
| 3,060,961 A | | 10/1962 | Conley | |

(Continued)

FOREIGN PATENT DOCUMENTS

| | | | | |
|---|---|---|---|---|
| EP | 2500609 A1 | * | 9/2012 | .......... F16K 15/038 |
| EP | 3263960 B1 | | 1/2019 | |

(Continued)

OTHER PUBLICATIONS

FMC Technologies, *Flowline Products and Services—World Proven Chiksan® and Weco® Equipment*(undated).

(Continued)

*Primary Examiner* — Craig M Schneider
*Assistant Examiner* — Frederick D Soski
(74) *Attorney, Agent, or Firm* — Keith B. Willhelm (57) ABSTRACT

Flapper valves may be provided with flapper assemblies. The flapper assemblies comprise a bracket, a flapper, a bearing, and a pin. The bracket has a pair of knuckles with a bore extending through the knuckles. The flapper has a knuckle with a bore. The bearing is mounted in the flapper knuckle bore and has a bore extending through it. The pin extends through the bores in the bracket knuckles and the bearing bore. The pin and the bracket are locked to each other. Clearance between the pin and the bearing bore allows relative rotation between the flapper and the pin. The flapper thus is mounted to the bracket for pivoting movement between a closed position, in which the flapper is adapted to bear on a seat in the flapper valve, and an open position, in which the flapper is adapted to pivot away from the seat.

32 Claims, 8 Drawing Sheets

(56) References Cited

U.S. PATENT DOCUMENTS

| | | | |
|---|---|---|---|
| 3,075,547 A * | 1/1963 | Scaramucci | F16K 15/03 |
| | | | 137/516.29 |
| 3,106,220 A * | 10/1963 | Hose | F16K 15/181 |
| | | | 137/514 |
| 3,119,594 A | 1/1964 | Heggem | |
| 3,292,653 A | 12/1966 | Scaramucci | |
| 3,366,137 A * | 1/1968 | Hansen | F16K 15/03 |
| | | | 137/527.4 |
| 3,393,704 A | 7/1968 | McFarland, Jr. | |
| 3,565,107 A | 2/1971 | Bunch | |
| 3,805,828 A * | 4/1974 | Panagrossi | F16K 15/03 |
| | | | 137/855 |
| 3,817,277 A * | 6/1974 | Wheatley | F16K 15/03 |
| | | | 137/515.7 |
| 3,875,963 A * | 4/1975 | Buck | F16K 15/181 |
| | | | 137/527.8 |
| 3,926,216 A * | 12/1975 | Rulcker | F16K 15/033 |
| | | | 137/527.8 |
| 4,054,153 A | 10/1977 | Guyton | |
| 4,128,111 A * | 12/1978 | Hansen | F16K 15/03 |
| | | | 137/515.7 |
| 4,164,958 A * | 8/1979 | Jaconette | F16K 15/03 |
| | | | 137/527 |
| 4,304,255 A | 12/1981 | Prince | |
| 4,308,894 A * | 1/1982 | Carpentier | F16K 15/03 |
| | | | 137/630.15 |
| 4,353,390 A * | 10/1982 | Karpenko | F16K 15/03 |
| | | | 137/527.8 |
| 4,508,139 A | 4/1985 | Teumer | |
| 4,586,534 A | 5/1986 | McNeely | |
| 4,618,824 A * | 10/1986 | Magee | F16K 15/03 |
| | | | 137/554 |
| 4,813,481 A | 3/1989 | Sproul et al. | |
| 4,825,902 A | 5/1989 | Helms | |
| 4,907,650 A | 3/1990 | Heinonen | |
| 5,213,306 A * | 5/1993 | Lageder | F16K 15/03 |
| | | | 251/298 |
| 5,497,802 A | 3/1996 | Whiteside | |
| 5,564,502 A | 10/1996 | Crow et al. | |
| 5,713,389 A | 2/1998 | Wilson, Jr. et al. | |
| 6,125,878 A | 10/2000 | Watts | |
| 6,196,261 B1 | 3/2001 | Dennistoun | |
| 6,543,474 B2 | 4/2003 | Fetterman | |
| 7,568,499 B2 | 8/2009 | Kishi et al. | |
| 7,726,418 B2 | 6/2010 | Ayling | |
| 9,334,972 B2 | 5/2016 | Talawar et al. | |
| 9,464,724 B2 | 10/2016 | Kamp et al. | |
| 9,816,628 B2 * | 11/2017 | Parameshwaran | F16K 1/2035 |
| 9,982,793 B2 | 5/2018 | Thomas et al. | |
| 2005/0139266 A1 * | 6/2005 | Partridge | F16K 15/03 |
| | | | 137/527.8 |
| 2007/0256740 A1 | 11/2007 | Sugai et al. | |
| 2007/0272308 A1 * | 11/2007 | Spears | F16K 15/03 |
| | | | 137/527.8 |
| 2008/0308159 A1 * | 12/2008 | Stunkard | F16K 15/03 |
| | | | 137/315.33 |
| 2010/0155143 A1 | 6/2010 | Braddick | |
| 2013/0000745 A1 * | 1/2013 | Witkowski | F16K 15/03 |
| | | | 137/15.18 |
| 2014/0261789 A1 | 9/2014 | Hull | |
| 2014/0332277 A1 | 11/2014 | Churchill | |
| 2015/0276245 A1 | 10/2015 | Walters et al. | |
| 2016/0010756 A1 * | 1/2016 | Fallon | F16K 27/0227 |
| | | | 137/12 |
| 2016/0018012 A1 | 1/2016 | Kamp et al. | |
| 2017/0067327 A1 | 3/2017 | Harris et al. | |
| 2018/0238459 A1 * | 8/2018 | Nowell | F16K 15/03 |
| 2018/0363789 A1 * | 12/2018 | Nguyen | F16K 15/03 |

FOREIGN PATENT DOCUMENTS

| | | |
|---|---|---|
| GB | 811237 | 4/1958 |
| WO | 2001/31167 A1 | 5/2001 |
| WO | 2016/110377 A1 | 7/2016 |
| WO | 2016/147200 A1 | 9/2016 |
| WO | 2017/031449 A1 | 2/2017 |

OTHER PUBLICATIONS

FMC Technologies, *Weco® 3" 15K Top Entry Check Valve*(Copyright 2016).
MIFAB, *BV1000 Cast Iron Backwater Valve with PVC Flapper*(Feb. 22, 2017).
Phoenix Global, *Dwg. No. CVA3-3DRM-S01*(Nov. 4, 2011).
Tech-Seal International, *Flapper Check Valve Operation and Maintenance Manual*(Apr. 22, 2015).
Weir Oil & Gas, *SPM® Well Service Pumps& Flow Control Products*(Copyright 2014).
Weir, *SPM® Flow Control Products Catalog*(May 4, 2015).

\* cited by examiner

FLAPPER VALVE

FIELD OF THE INVENTION

The present invention relates generally to flapper valves, and especially to flapper check valves for fluid transportation systems conveying fluids under high pressure as are common, for example, in the oil and gas industry.

BACKGROUND OF THE INVENTION

Hydrocarbons, such as oil and gas, may be recovered from various types of subsurface geological formations. The formations typically consist of a porous layer, such as limestone and sands, overlaid by a nonporous layer. Hydrocarbons cannot rise through the nonporous layer. Thus, the porous layer forms a reservoir, that is, a volume in which hydrocarbons accumulate. A well is drilled through the earth until the hydrocarbon bearing formation is reached. Hydrocarbons then are able to flow from the porous formation into the well.

In what is perhaps the most basic form of rotary drilling methods, a drill bit is attached to a series of pipe sections referred to as a drill string. The drill string is suspended from a derrick and rotated by a motor in the derrick. A drilling fluid or "mud" is pumped down the drill string, through the bit, and into the well bore. This fluid serves to lubricate the bit and carry cuttings from the drilling process back to the surface. As the drilling progresses downward, the drill string is extended by adding more pipe sections.

A modern oil well typically includes a number of tubes extending wholly or partially within other tubes. That is, a well is first drilled to a certain depth. Larger diameter pipes, or casings, are placed in the well and cemented in place to prevent the sides of the borehole from caving in. After the initial section has been drilled, cased, and cemented, drilling will proceed with a somewhat smaller well bore. The smaller bore is lined with somewhat smaller pipes or "liners." The liner is suspended from the original or "host" casing by an anchor or "hanger." A well may include a series of smaller liners, and may extend for many thousands of feet, commonly up to and over 25,000 feet.

Hydrocarbons, however, are not always able to flow easily from a formation to a well. Some subsurface formations, such as sandstone, are very porous. Hydrocarbons are able to flow easily from the formation into a well. Other formations, however, such as shale rock, limestone, and coal beds, are only minimally porous. The formation may contain large quantities of hydrocarbons, but production through a conventional well may not be commercially practical because hydrocarbons flow though the formation and collect in the well at very low rates. The industry, therefore, relies on various techniques for improving the well and stimulating production from formations. In particular, various techniques are available for increasing production from formations which are relatively nonporous.

Perhaps the most important stimulation technique is the combination of horizontal well bores and hydraulic fracturing. A well will be drilled vertically until it approaches a formation. It then will be diverted, and drilled in a more or less horizontal direction, so that the borehole extends along the formation instead of passing through it. More of the formation is exposed to the borehole, and the average distance hydrocarbons must flow to reach the well is decreased. Fractures then are created in the formation which will allow hydrocarbons to flow more easily from the formation.

Fracturing a formation is accomplished by pumping fluid, most commonly water, into the well at high pressure and flow rates. Proppants, such as grains of sand, ceramic or other particulates, usually are added to the fluid along with gelling agents to create a slurry. The slurry is forced into the formation at rates faster than can be accepted by the existing pores, fractures, faults, vugs, caverns, or other spaces within the formation. Pressure builds rapidly to the point where the formation fails and begins to fracture. Continued pumping of fluid into the formation will tend to cause the initial fractures to widen and extend further away from the well bore, creating flow paths to the well. The proppant serves to prevent fractures from closing when pumping is stopped.

A formation rarely will be fractured all at once. It typically will be fractured in many different locations or zones and in many different stages. Fluids will be pumped into the well to fracture the formation in a first zone. After the initial zone is fractured, pumping is stopped, and a plug is installed in the liner at a point above the fractured zone. Pumping is resumed, and fluids are pumped into the well to fracture the formation in a second zone located above the plug. That process is repeated for zones further up the formation until the formation has been completely fractured.

Once the well is fractured, large quantities of water and sand that were injected into the formation eventually must be allowed to flow out of the well. The water and sand will be separated from hydrocarbons produced by the well to protect downstream equipment from damage and corrosion. The production stream also may require additional processing to neutralize corrosive agents in the stream.

Figure 1:
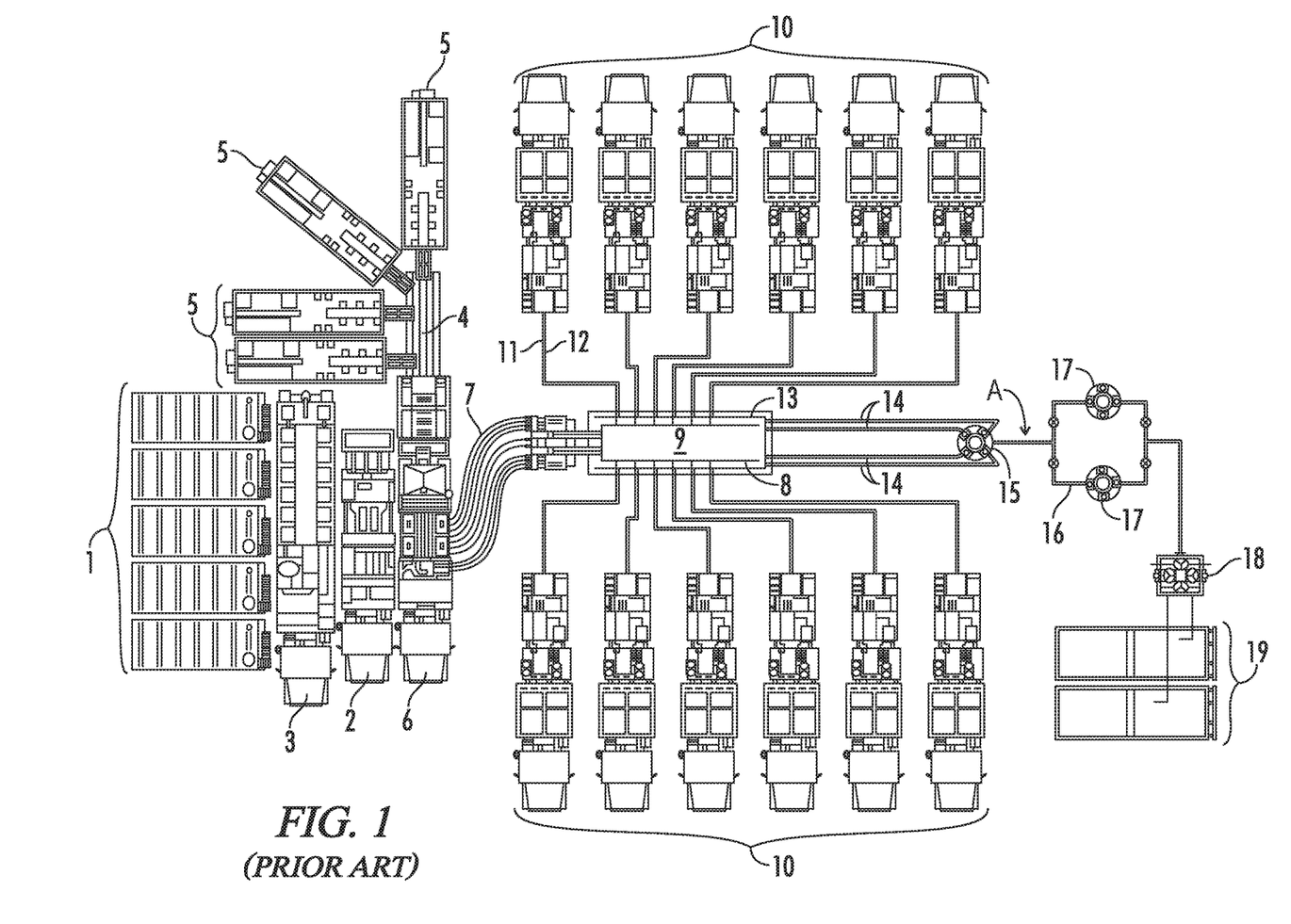
FIG. 1 (prior art) is a schematic view of a system for fracturing a well and receiving flowback from the well, which system includes various high-pressure flow lines, such as flow lines 12 and 14.

Systems for successfully performing a fracturing operation, therefore, are extensive and complex, as may be appreciated from FIG. 1. FIG. 1 illustrates schematically a common, conventional frac system. Water from tanks 1 and gelling agents dispensed by a chemical unit 2 are mixed in a hydration unit 3. The discharge from hydration unit 3, along with sand carried on conveyors 4 from sand tanks 5 is fed into a blending unit 6. Blender 6 mixes the gelled water and sand into a slurry. The slurry is discharged through low-pressure hoses 7 which convey it into two or more low-pressure lines 8 in a frac manifold 9. The low-pressure lines 8 in frac manifold 9 feed the slurry to an array of pumps 10, perhaps as many as a dozen or more, through low-pressure "suction" hoses 11.

Pumps 10 take the slurry and discharge it at high pressure through individual high-pressure "discharge" lines 12 into two or more high-pressure lines or "missiles" 13 on frac manifold 9. Missiles 13 flow together, i.e., they are manifolded on frac manifold 9. Several high-pressure flow lines 14 run from the manifolded missiles 13 to a "goat head" 15. Goat head 15 delivers the slurry into a "zipper" manifold 16 (also referred to by some as a "frac manifold"). Zipper manifold 16 allows the slurry to be selectively diverted to, for example, one of two well heads 17. Once fracturing is complete, flow back from the fracturing operation discharges into a flowback manifold 18 which leads into flowback tanks 19.

Frac systems are viewed as having "low-pressure" and "high-pressure" sides or, more simply, as having low sides and high sides. The low side includes the components upstream of the inlet of pumps 10, e.g., water tanks 1, hydration unit 3, blending unit 6, and the low-pressure lines 8 of frac manifold 9, which operate under relatively low pressures. The high side includes all the components downstream of the discharge outlets of pumps 10, e.g., the high-pressure missiles 13 of frac manifold 9 and flow lines 14 running to goat head 15, which operate under relatively high pressures.

The flow lines and units making up the high-side of a frac system, such as pump discharge lines 12 and flow line 14, typically are assembled from a large number of individual components often referred to as "frac iron," "flow iron," or "ground iron." Such components include straight steel pipe, fittings for splitting, combining, or changing direction of a line, gauges and other monitoring equipment, and valves and other control devices. Flow iron components are fabricated from heavy, high tensile steel and are quite rugged. They may be rated for high-pressure service up to 20,000 psi.

Because frac systems are required at a site for a relatively short period of time, frac iron components often are joined by unions. Unions allow the components to be connected ("made up") and disconnected ("broken down") relatively quickly. The three types of unions commonly used in frac systems are hammer (or "Weco®") unions, clamp (or "Greyloc®") unions, and flange unions. Though spoken of in terms that may imply they are discreet components, unions are actually interconnected subassemblies of the components joined by the union. A male sub will be on one component, and a mating female sub will be on the other. The subs then will be connected to each other to provide the union.

The optimal volume, pumping rate, and pumping schedule for a fracturing operation will be determined in view of the physical properties of the formation, the depth at which it will be fractured, and the fluid that will be pumped into the formation. Such pumping regimens may vary considerably and, as noted above, typically proceeds in multiple stages. Thus, fluid flow through the frac system is carefully controlled and monitored throughout the operation.

Fluid is designed to flow through most of a frac system in only one direction: towards the well. Once pumping is stopped, however, large quantities of slurry will flow out of the well at rates and pressures at least initially comparable to those used to fracture the well. Shut off valves will be installed in the system to divert that return flow into recovery tanks and to protect upstream portions of the system. In particular, pumps must be protected against back flow. Actuating shut off valves, however, may take some time. Operators also may neglect to open or shut the appropriate valves. Thus, frac systems commonly will incorporate various automatic check valves to ensure that fluid is able to travel in only one direction through a particular part of the system.

The check valves in frac systems generally are "flapper" style check valves. Flapper valves, as their name suggests, incorporate a pivoting flapper. The flapper normally hangs down, under the influence of gravity, across the face of a seat provided in the valve conduit. Fluid flowing through the valve conduit in the desired direction will push against the flapper, causing it to swing up and allow fluids to pass through the valve. Flow in the opposite, undesired direction, however, will cause the flapper to bear and seal against the seat, shutting off back flow through the valve.

Flapper valves are better suited than other check valves, such as dart check valves, for systems handling particulate laden, abrasive fluids such as frac fluids. Particulate matter is less likely to interfere with the operation of flapper valves. Eventually, however, the flapper and seat can become eroded such that the ability of the valve to check flow in the opposite direction is impaired. Thus, many conventional flapper valves have designs which allow the flapper and the seat to be replaced periodically. Such valves include what may be referred to as inlet entry and top entry designs.

Inlet entry designs, such as Weco® flapper check valves available from FMC Technologies, Inc, Houston, Tex., have a replaceable assembly that includes both the seat and the flapper. The seat-flapper assembly is carried within the valve conduit. The assembly may be accessed for replacement by disassembling a two-part valve body. Once the inlet side of the valve body is separated from the outlet side, the seat-flapper assembly may be pulled out of the outlet side, and a new assembly inserted. Necessarily, however, the valve must be disassembled from the flow line in order to replace either the flapper or the seat.

Top entry designs have separate flappers and seats which may be accessed through a service port. Examples of such top entry flapper valves include those available from Tech-Seal International (TSI Flow Products), Houston, Tex., Weco top entry valves available from FMC Technologies, and SPM® 1502 clapper valves available from S.P.M. Flow Control, Inc., Fort Worth, Tex. In top entry valves, the valve body is a single integral piece that is provided with a service port extending from the top of the valve into the valve conduit. The service port is covered by a cap which can be removed to access the flapper and seat. The seat, for example, may be carried in the valve conduit near the inlet. The flapper may be mounted on a bracket which rests on a shoulder in the service port and is held there by the access cap.

Another design for flapper valves is disclosed in applicant's U.S. Pat. No. 10,295,071 to D. Nguyen. The flapper valves disclosed therein have a two-pan valve body and a service port. The two-part body is disassembled to replace the seat. An access cap is threaded into the service port and may be removed to allow replacement of a bracket-flapper assembly. The cap has a depending skirt. When the cap is threaded into the service port, the bottom of the skirt bears on the bracket to hold it and the flapper in their proper place. The bracket has a pair of hinge knuckles, and the flapper has a single knuckle that extends between the bracket knuckles. A pin extends through aligned cylindrical openings in the knuckles. The pin can rotate relative to the bracket and the flapper can rotate relative to the pin. Thus, the flapper is able to pivot to automatically open or close the valve.

Many flapper valves lack a compact design, in large part due to the features that allow the valve to be easily assembled into a flow line. For example, flapper valves are most commonly provided with hammer union subs at their inlet and outlet. The subs allow the valve to be assembled quickly and reliably into a flow line with hammer unions. The hammer union subs, however, can add significantly to the length of the valve. Added length in turn increases the amount of material required to fabricate the valve body and the weight of the finished valve. Flapper valves also can be subject to intense vibrations which create high cyclic torque across a hammer union. Many conventional hammer union designs do not efficiently distribute that stress and other stress created in making up the union. They may tend to leak and may fracture or break.

Flapper valves, like other flow iron components, are fabricated from steel and are quite rugged. Nevertheless, they can suffer shortened service life or failure due to the harsh conditions to which they are exposed. Not only are fluids pumped through the system at very high pressure and flow rates, but the fluid is abrasive and corrosive. Components may suffer relatively rapid erosion. The flapper assembly is especially susceptible to wear. Fluid typically can circulate around and through the flapper hinge. Wear in the hinge can cause misalignment and improper seating of the flapper on the seat. Any leakage or failure of flapper valves on site may interrupt fracturing, potentially reducing its effectiveness and inevitably increasing the amount of time required to complete the operation.

Frac jobs also have become more extensive, both in terms of the pressures required to fracture a formation and the time required to complete all stages of an operation. Prior to horizontal drilling, a typical vertical well might require fracturing in only one, two or three zones at pressures usually well below 10,000 psi. The longest horizontal extensions of a well bore now are almost three and a half miles long. Fracturing a horizontal well, therefore, may require fracturing in 20 or more zones. Horizontal wells in shale formations such as the Eagle Ford shale in South Texas typically require fracturing pressures of at least 9,000 psi and 6 to 8 hours or more of pumping. Horizontal wells in the Haynesville shale in northeast Texas and northwest Louisiana require pressures around 13,500 psi. Pumping may continue near continuously—at flow rates of 2 to 3 thousand gallons per minute (gpm)—for several days before fracturing is complete. All that places increasing performance demands on flapper valves and other equipment used to fracture a well.

The statements in this section are intended to provide background information related to the invention disclosed and claimed herein. Such information may or may not constitute prior art. It will be appreciated from the foregoing, however, that there remains a need for new and improved pressure release valves and methods for protecting high-pressure flowlines from excessive pressure. Such disadvantages and others inherent in the prior art are addressed by various aspects and embodiments of the subject invention.

SUMMARY OF THE INVENTION

The subject invention, in its various aspects and embodiments, relates generally to flapper check valves and encompasses various embodiments and aspects, some of which are specifically described and illustrated herein. One broad aspect of the invention provides for a flapper assembly for a flapper valve for fluid transportation systems. The flapper assembly comprises a bracket, a flapper, a bearing, and a pin. The bracket is adapted for mounting in the flapper valve. It has a pair of knuckles with a bore extending through the knuckles. The flapper has a knuckle with a bore extending through it. The bearing is mounted in the flapper knuckle bore and has a bore extending through it. The pin extends through the bores in the bracket knuckles and the bore in the bearing. The pin and the bracket are locked to each other. There is clearance between the pin and the bearing bore that allows relative rotation between the flapper and the pin. The flapper thus is mounted to the bracket for pivoting movement between a closed position, in which the flapper is adapted to bear on a seat in the flapper valve, and an open position, in which the flapper is adapted to pivot away from the seat.

Other embodiments provide such flapper assemblies where the pin is pressure fitted in the bores through the bracket knuckles, where the bearing is pressure fitted in the bore through the flapper knuckle, or where the flapper assembly comprises a pair of the bearings.

Still other embodiments provide such flapper assemblies where the bearings comprise a seal face and an annular seal is provided between the seal face and the bracket knuckle. Yet other embodiments provide such assemblies where the bearings comprise a body portion and an enlarged end providing the seal face and where the body portions of the bearings extend into the bore in the flapper knuckle.

Further embodiments provide such flapper assemblies where an annular seal is provided between the pin and the bores in the bracket knuckles.

In other aspects and embodiments, the subject invention provides flapper valves for fluid transportation systems. The flapper valves comprise a valve body, a passage, a seat, and a flapper assembly. The valve body is adapted for assembly into the system. The passage is defined in the valve body and is adapted to conduct fluids from the system through the flapper valve. The flapper assembly is an embodiment of the novel flapper assemblies. The flapper thus is able to pivot between a closed position, in which the flapper bears on the seat and shuts off back flow through the passage, and an open position, in which the flapper is pivoted away from the seat and allows fluid flow through the passage.

Other embodiments provide such flapper valves where the flapper valve comprises a service port and a cap removably closing the service port and wherein the flapper assembly is mounted in the service port.

In other aspects and embodiments, the subject invention provides flapper valves for fluid transportation systems. The flapper valve comprises a valve body, a passage, a seat, and a flapper. The valve body is adapted for assembly into the system and comprises a first sub and a second sub removably assembled to each other. The passage is defined in the valve body. It extends through the first and second subs and is adapted to conduct fluids from the system through the flapper valve. The flapper is mounted for pivoting movement between a closed position, in which the flapper bears on the seat and shuts off back flow through the passage, and an open position, in which the flapper is pivoted away from the seat and allows fluid flow through the passage.

The second sub has first and second arrays of holes and a flange union face. The holes in the first array extend from an inlet side of the second sub to an outlet side of the second sub that is adjacent to the first sub. The second sub is removably assembled to the first sub by a first set of threaded connectors extending through the first array of holes into the first sub. The flange union face is on the inlet side of the second sub. The flange union face has a flat bearing surface and a second array of holes. The bearing surface extends around the passage and has an annular groove adapted to receive a seal. The second array of holes are adapted to accommodate a second set of threaded connectors for joining the flapper valve to a flowline component.

Other embodiments provide such flapper valves where the second sub comprises a toroid-shaped head having a rectangular cross-section and the first array of holes extend through the head.

Still other embodiments provide such flapper valves where the holes in the second array are bottomed holes and the threaded connectors in the second set are threaded studs mounted in the second array of holes.

Yet other embodiments provide such flapper valves where the threaded connectors in the first set are bolts and the holes in the first array are countersunk on the inlet side to accommodate the heads of the bolts.

Additional embodiments provide such flapper valves where the first and second arrays of holes are concentric circular arrays and the first array of holes is radially outward of the second array of holes.

Further embodiments provide such flapper valves where the flapper valve comprises an alignment pin between the first and second subs.

In other aspects and embodiments, the subject invention provides flapper valves for fluid transportation systems. The flapper valves comprise a valve body, a passage, a service port, a cap, a seat, a flapper assembly, and a gasket. The valve body is adapted for assembly into the system and defines the passage and the service port. The passage is adapted to conduct fluids from the system through the flapper valve. The cap removably closes the service port. The cap has a head and a skirt. The skirt depends from the head and extends into the service port. The head has a plurality of holes adapted to accommodate threaded connectors removably assembling the cap to the valve body. The flapper assembly is removably mounted within the service port. It comprises a bracket and a flapper. The flapper is mounted to the bracket for pivoting movement between a closed position, in which the flapper bears on the seat and shuts off back flow through the passage, and an open position, in which the flapper is pivoted away from the seat and allows fluid flow through the passage. The gasket is placed between the cap skirt and the bracket such that the cap skirt bears on the bracket through the gasket.

Other embodiments provide such flapper valves where the gasket is fabricated from a hard plastic or rubber.

Still other embodiments provide such flapper valves where annular seals are provided between the cap skirt and the service port.

In other aspects and embodiments, the invention provides for flow lines for a high-pressure fluid transportation system. The flow line comprises embodiments of the novel flapper valves.

Still other aspects and embodiments of the subject invention provide high-pressure fluid transportations systems. The systems comprise embodiments of the novel flow lines. Other embodiments provide such systems where the systems are for fracturing a well.

Yet other aspects and embodiments of the subject invention provide methods for controlling flow through a fluid transportation system comprising a flow line. The methods comprise providing an embodiment of the novel flapper valves in the flow line and transporting fluid through the flow line.

Finally, still other aspects and embodiments of the invention provide apparatus and methods having various combinations of such features as will be apparent to workers in the art.

Thus, the present invention in its various aspects and embodiments comprises a combination of features and characteristics that are directed to overcoming various shortcomings of the prior art. The various features and characteristics described above, as well as other features and characteristics, will be readily apparent to those skilled in the art upon reading the following detailed description of the preferred embodiments and by reference to the appended drawings.

Since the description and drawings that follow are directed to particular embodiments, however, they shall not be understood as limiting the scope of the invention. They are included to provide a better understanding of the invention and the manner in which it may be practiced. The subject invention encompasses other embodiments consistent with the claims set forth herein.

In the drawings and description that follows, like parts are identified by the same reference numerals. The drawing figures are not necessarily to scale. Certain features of the embodiments may be shown exaggerated in scale or in somewhat schematic form and some details of conventional design and construction may not be shown in the interest of clarity and conciseness.

DESCRIPTION OF ILLUSTRATIVE EMBODIMENTS

The subject invention, in various aspects and embodiments, is directed generally to flapper valves for flowlines, and especially for high-pressure flowlines. Specific embodiments will be described below. For the sake of conciseness, however, all features of an actual implementation may not be described or illustrated. In developing any actual implementation, as in any engineering or design project, numerous implementation-specific decisions must be made to achieve a developers' specific goals. Decisions usually will be made consistent within system-related and business-related constraints, and specific goals may vary from one implementation to another. Development efforts might be complex and time consuming and may involve many aspects of design, fabrication, and manufacture. Nevertheless, it should be appreciated that such development projects would be a routine effort for those of ordinary skill having the benefit of this disclosure.

Broad embodiments of the novel valves are directed to flapper valves which may be used in fluid transportation systems, such as fracturing systems, to allow flow in a flow direction, but to check reverse flow through the system. They comprise a valve body, a passage defined in the valve body, a seat, and a flapper. The valve body is adapted for assembly into the system. The passage is adapted to conduct fluids from the system through the flapper valve. The flapper is able to pivot between a closed position, in which the flapper bears on the seat and shuts off back flow through the passage, and an open position, in which the flapper is pivoted away from the seat and allows fluid flow through the passage.

The novel flapper valves may be used in a variety of systems. They are particularly useful in high pressure flow lines as are common in chemical and other industrial plants, on marine dredging vessels, strip mines, and especially in the oil and gas industry. Certain embodiments are particularly well suited as components of temporary pipe and flow line installations. Hydraulic fracturing systems, such as those shown in FIG. 1, are a very common application where flapper valves are a practical necessity. They may be assembled into portions of the high-pressure side of a frac system where fluid is intended to flow only in one direction. The novel flapper valves readily allow flow in the desired direction. If downstream conditions otherwise would induce back flow through the system, however, the novel valves will automatically shut off and substantially preclude back flow through the system.

For example, the novel flapper valves may be assembled at point A into the high-pressure flow line running from goat head 15 to zipper manifold 16 in the frac system shown in FIG. 1. Flow at point A is intended to go in only one direction: from goat head 15 into zipper manifold 16. In the absence of a flapper valve, back flow through the flow line may damage pumps 10.

A preferred flapper valve 20 is shown in greater detail in FIGS. 2-9. As seen best in FIGS. 4-5, valve 20 generally comprises a valve body 21. Valve body 21 comprises the major structural portion of flapper valve 20 and defines many of its primary features, including a central passage 22 and a service port 23. Service port 23 is closed by a removable cap 26. Valve body 21 also provides a housing for various internal components of valve 20, including a replaceable flapper assembly 60 and a replaceable seat insert 80.

Figure 4:
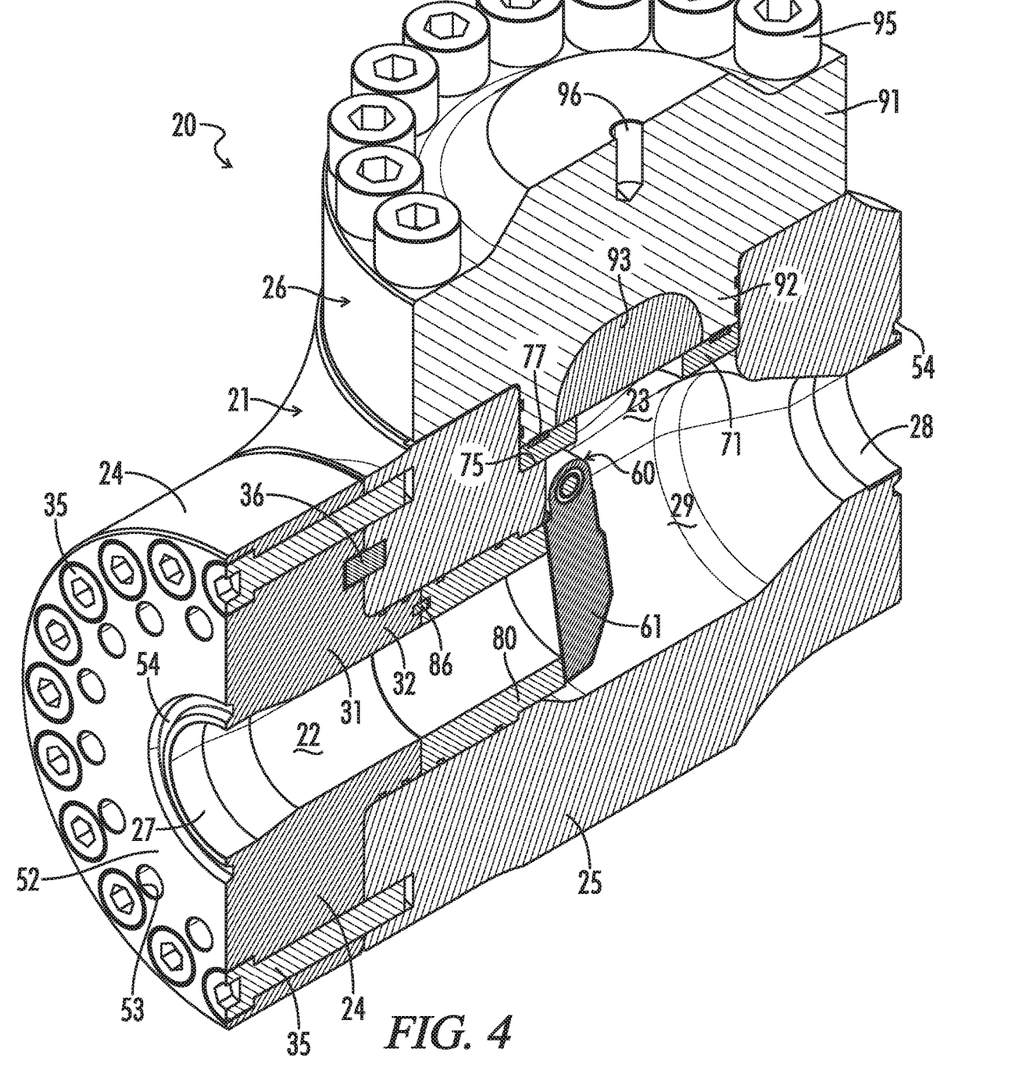
FIG. 4 is an isometric, cross-sectional view of novel flapper valve 20 shown in FIG. 2 taken generally along a vertical, axial plane and above, in front of, and from one side of flapper valve 20. Flapper valve 20 is shown oriented as it would be when installed with flapper 61 in in its normal, "closed" position.
Figure 5:
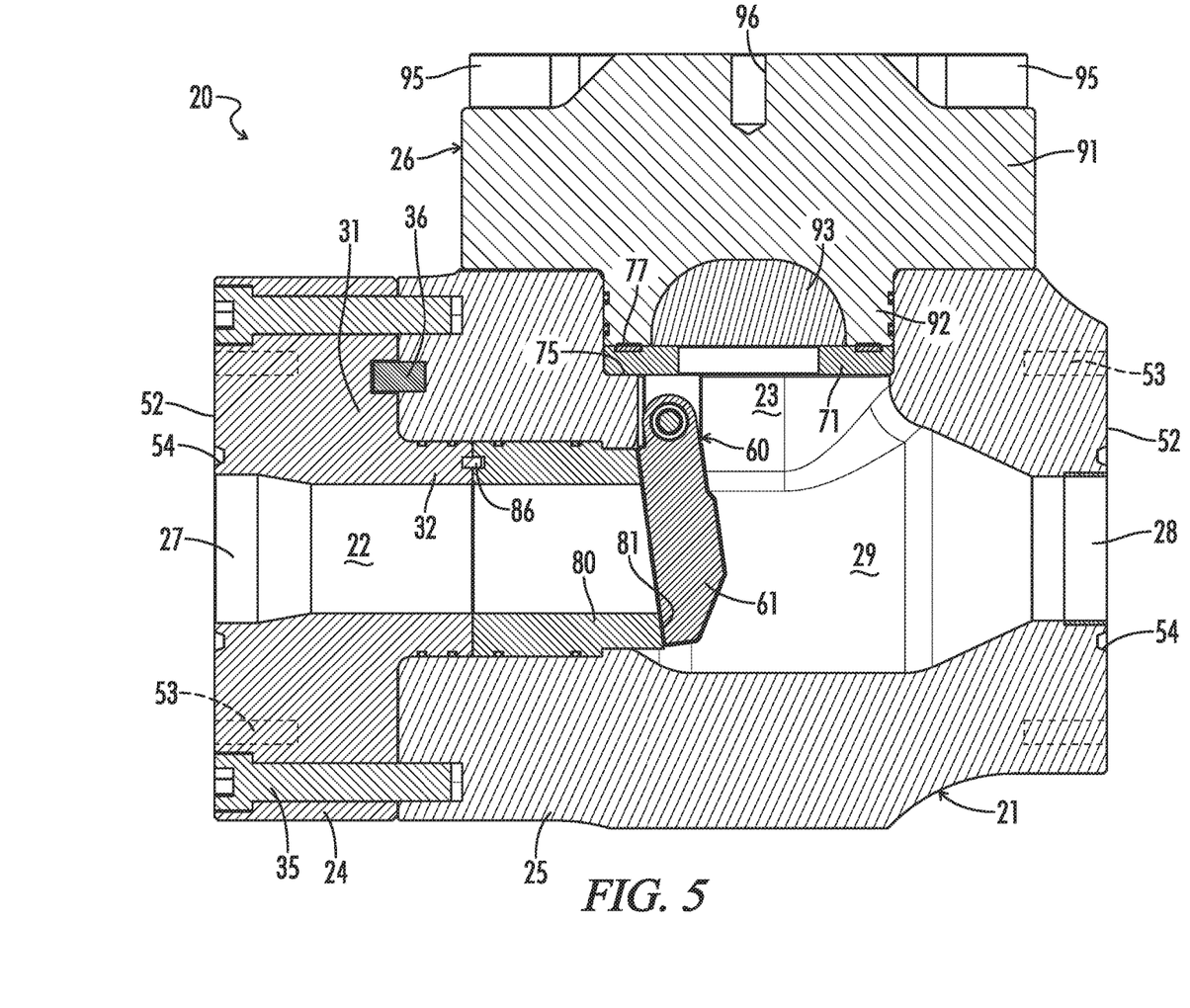
FIG. 5 is a cross-sectional view of flapper valve 20 shown in FIGS. 2-3, taken along a vertical, axial plane and again showing flapper valve 20 in its installed orientation.
Figure 6:
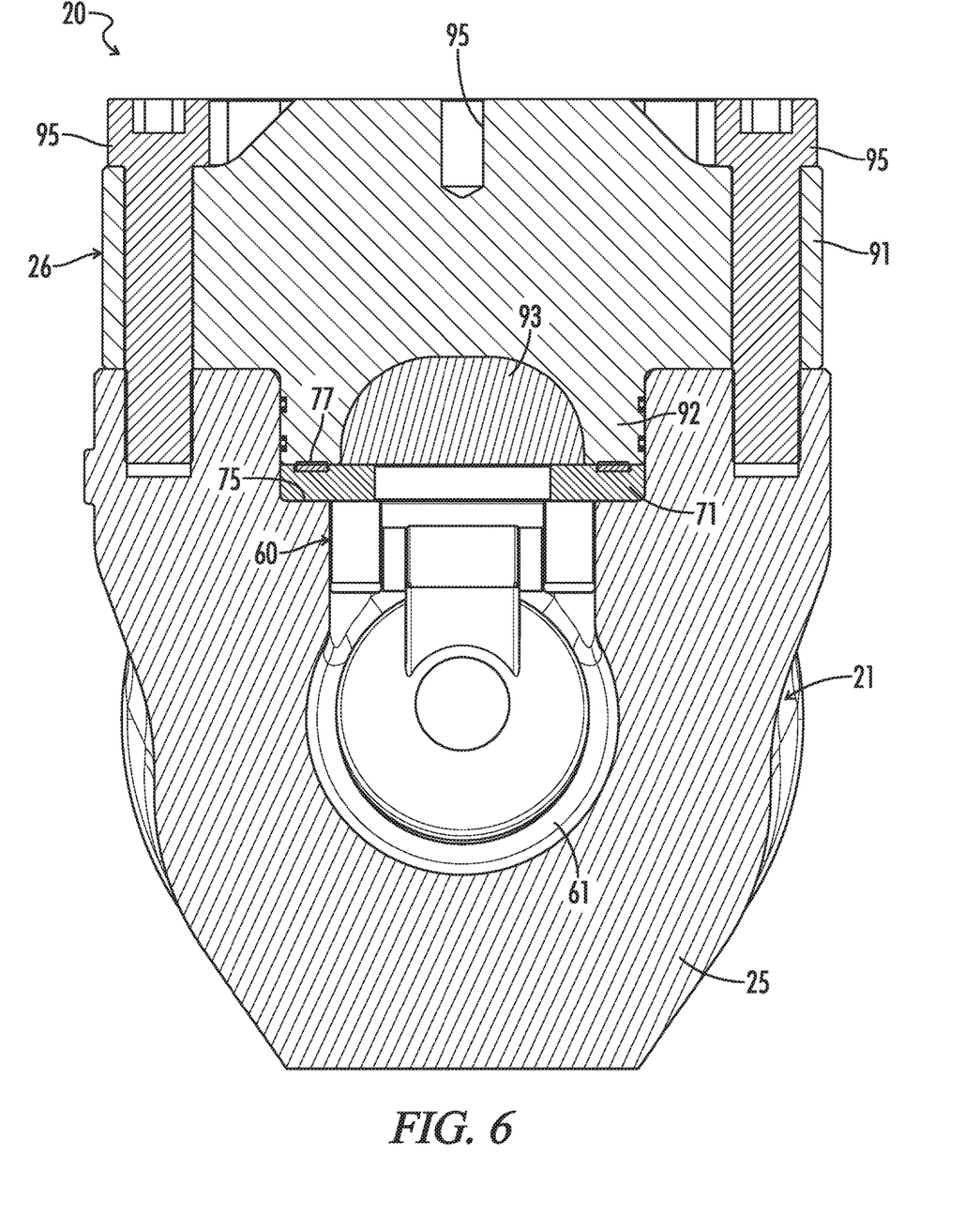
FIG. 6 is a cross-sectional view of flapper valve 20 taken along a vertical, transverse plane.

Central passage 22 provides a conduit for fluids conveyed through valve 20 and the flow line into which it is assembled. Central passage 22 has a generally cylindrical shape and extends from an inlet 27 on inlet sub 24 to an outlet 28 on outlet sub 25. It has a substantially smooth and uniform inner surface for much of its extent. Ideally, it would be smooth and uniform along its entire length.

Passage 22, however, is enlarged somewhat in the central portion of valve 20 to provide room for operation of flapper assembly 60. That enlarged portion of passage 22 may be referred to as a flapper chamber 29. As described further below, flapper assembly 60 will allow flow in only one direction through passage 22 and valve 20. Flapper assembly 60 can be accessed and replaced through service port 23 by removing cap 26. Seat insert 80 can be accessed and replaced by disassembling inlet sub 24 and outlet sub 25.

Valve body 21 is assembled from an inlet sub 24 and an outlet sub 25. Service port 23 and most of central passage 22 are provided in outlet sub 25. Central passage 22, however, extends through inlet sub 24 as well. Inlet sub 24 may be viewed as having a toroid-shaped head 31 with a generally rectangular cross-section. The outlet side, that is, the side of head 31 closest to outlet 28 extends across and is adjacent to a flat outer surface on the inlet side of outlet sub 25. An annular boss 32 extends axially from head 31 into an enlarged diameter portion of passage 22 in outlet sub 25. A pressure seal preferably is provided between boss 32 and passage 22, for example, by mounting elastomeric O-rings and backup rings in a groove extending around the outer surface of annular boss 32.

Inlet sub 24 is removably assembled to outlet sub 25, for example, by threaded bolts 35. Threaded bolts 35 extend through openings provided in head 31. The openings are arranged in a circular array along the periphery of head 31. They extend axially from the outlet side of head 31 through to its inlet side and align with threaded openings in outlet sub 25. A pin 36 or other alignment devices preferably are provided to ensure that the openings are easily aligned. The openings in head 31 preferably are counter-sunk on the inlet side, thus allowing the head of bolts 35 to lie at or below the outer surface of head 31.

Figure 2:
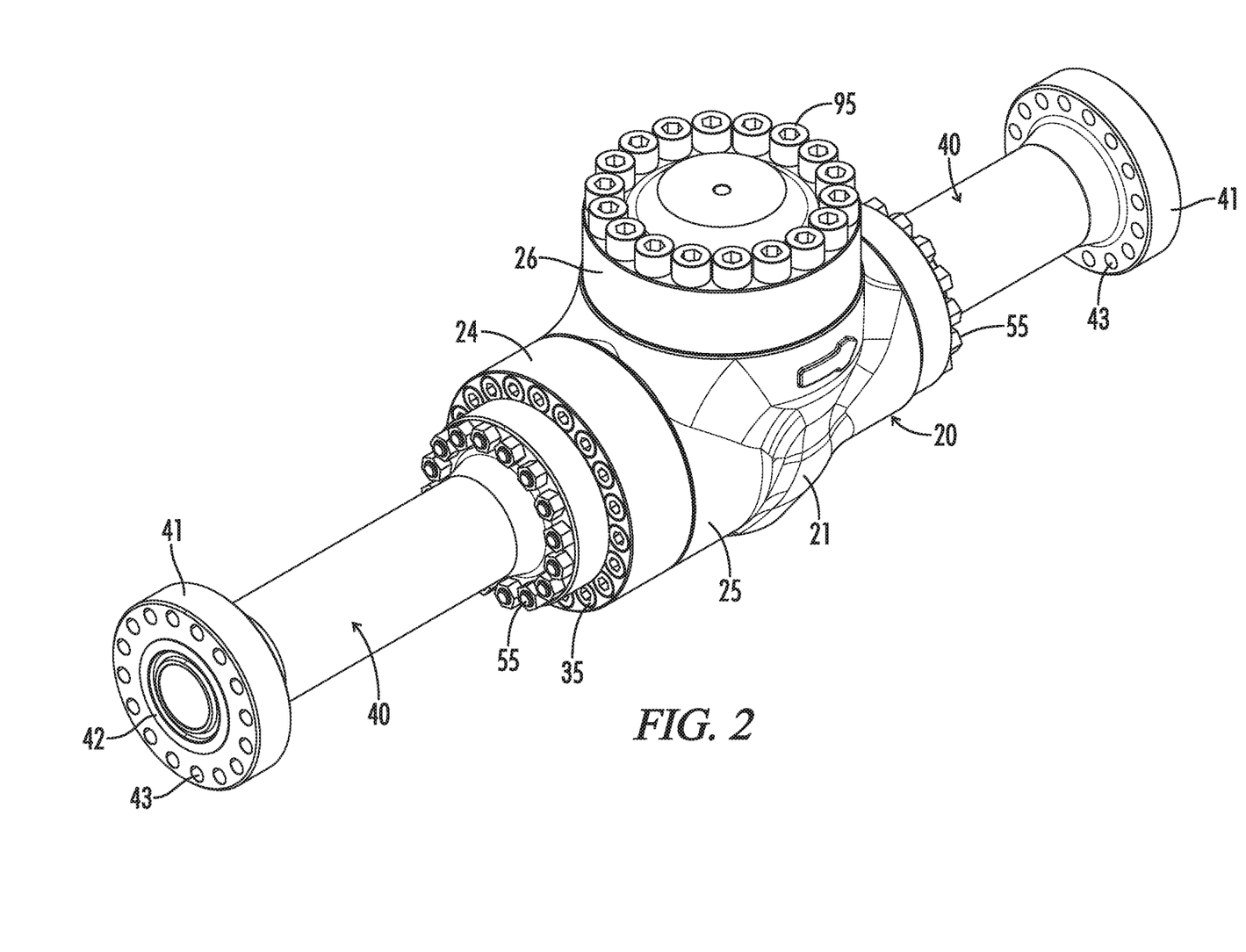
FIG. 2 is an isometric view of a portion of a high-pressure flow line, such as the flow line running from goat head 15 to zipper manifold 16 in the fracturing systems shown in FIG. 1, which includes conventional spools 40 and a first preferred embodiment 20 of the flapper valves of the subject invention.

Flapper valve 20 is adapted for assembly into a flow line of systems such as the frac system shown in FIG. 1. For example, as shown in FIG. 2, valve 20 may be joined to spools 40 in a high-pressure flowline. Spools 40 are conventional spools. They are essentially pipes which provide a conduit for conveying fluid through the flow line. A pair of annular flanges 41 are provided at each end of the pipe. The outer flat surfaces of flanges 41 have a flange union face 42. Each of flanges 41 is provided with, for example, 16 through holes 43 extending through flanges 41. Holes 43 are adapted to accommodate the passage of threaded connectors, such as threaded studs 55 that connect spool 40 and flapper valve 20 together.

Figure 3:
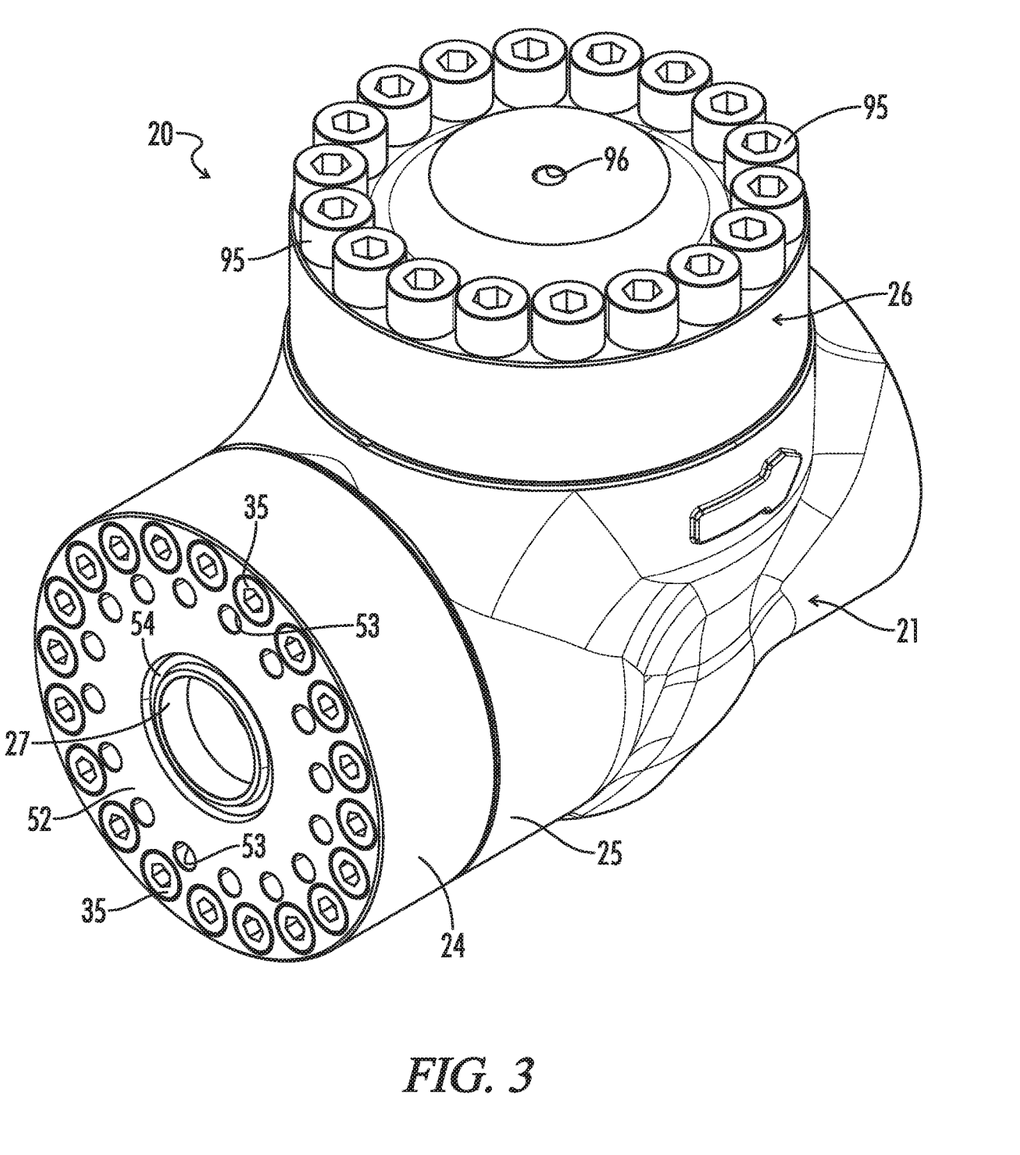
FIG. 3 is an isometric view of flapper valve 20 shown in FIG. 2.

As may be seen in FIGS. 3-5, flapper valve 20 also has flange union faces 52. More particularly, a flange union face 52 is provided on the axial, inlet side of inlet sub 24 and on the axial, outlet side of outlet sub 25. Union faces 52 will allow flapper valve 20 to be quickly and easily made up to or broken down from spool 40 or other components of the system by flange unions.

Union faces 52 on flapper valve 20 are provided with, for example, a circular array of 16 holes 53 as shown in FIGS. 3-4. Holes 53 preferably, as shown, are bottomed. Typically, they are threaded to accept threaded studs 55 (not shown in FIGS. 3-4). Alternately, holes 53 may be adapted to receive threaded standing bolts or other threaded connectors. Holes 53 are arranged angularly about the openings of passage 22. The circular array of holes 53 on inlet sub 24 preferably, as shown, are concentric to and radially inward of the array of through holes through which threaded bolts 35 extend to connect inlet sub 24 to outlet sub 25. When provided with studs or other threaded connectors, mating components, such as spools 40 may be joined to flapper valve 20 by a flange union as shown in FIG. 2. More or fewer holes 53 and connectors may be provided depending upon the size of the union between the components and the pressures for which the union will be rated.

Typically, union faces 52 will be provided with a metal seal (not shown). The seal is disposed in a groove, such as annular groove 54 shown in FIGS. 2-5, that extends around the openings of passage 22. A seal is generally required to avoid leakage at union faces 52. If desired, weep ports, may be provided in valve 20. Weep ports are relatively small passageways extending from seal grooves 54 in union faces 52 to an outer surface of valve 20. If there is any leakage around the metal seal and union faces 52, it may be more easily detected by monitoring the weep port for any discharge of fluid. Weep ports may allow a relatively minor leak to be addressed before developing into a more serious situation.

Also, and though described as "flat" herein, union faces 42 and 52 typically will have a very slight annular boss extending upwards around the openings of passage 22. The annular boss will help ensure that the abutment between mating union faces is properly loaded when the union is made up. It also will be appreciated that as used herein, a component need not have a flange to incorporate a "flange" union face or to be joined by a "flange" union. A flange-style union face may be provided on structural features of a component other than flanges. The designs and features of flange-style union faces and flange-style unions are well known. The union faces on valve 20 may be varied in accordance with common practice in the art.

Union faces allow flapper valve 20 to be made up and broken down from flow lines via flange unions with other flowline components having flange union faces. The novel flapper valves, however, may be provided with other subs allowing them to be joined to other flowline components with different unions. The novel flapper valves may be provided with male or female hammer union subs, for example, allowing them to be assembled with hammer unions. Likewise, the valves may be provided with ends that allow them to be made up and broken down by conventional clamp or flange unions, by threaded connections, or by any other conventional assembly methods.

It will be appreciated, however, that inlet sub 24 as exemplified is greatly preferred. By providing head 31 of inlet sub 24 with an array of array of bottomed holes 53 and an array of through holes, flapper valve 20 will have a compact, overall design. At the same time, bolts 35 used to assemble inlet sub 24 to outlet sub 25, and threaded studs 55 and their associated nuts that are used to make up a flange union between flapper valve 20 and other flowline components, are easily accessible. Head 31 being "double studded," thus allows easy assembly of valve body 21 and allows flapper valve 20 to be joined easily to other flowline components by reliable and durable flange unions. Moreover, by incorporating double-studded head 31, inlet sub 24 has a significantly smaller axial dimension than it would it if incorporated conventional subs. For example, providing inlet sub 24 with a first flange for connecting it to outlet sub 25 and a second flange to connect it to another component, similar to flanges 41 on spools 40, would greatly increase its length and in turn the length of flapper valve 20. Providing clamp union or hammer union subs also would add additional length to the inlet sub.

Figure 7:
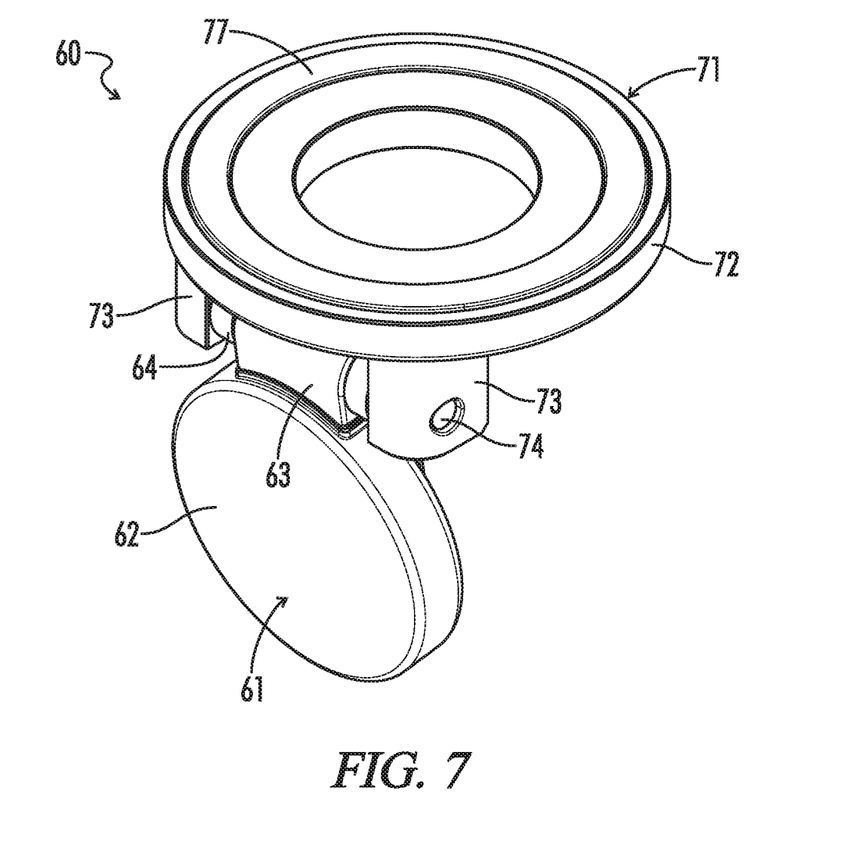
FIG. 7 is an isometric view, taken generally from above, of a flapper assembly 60 which is incorporated into flapper valve 20.
Figure 8:
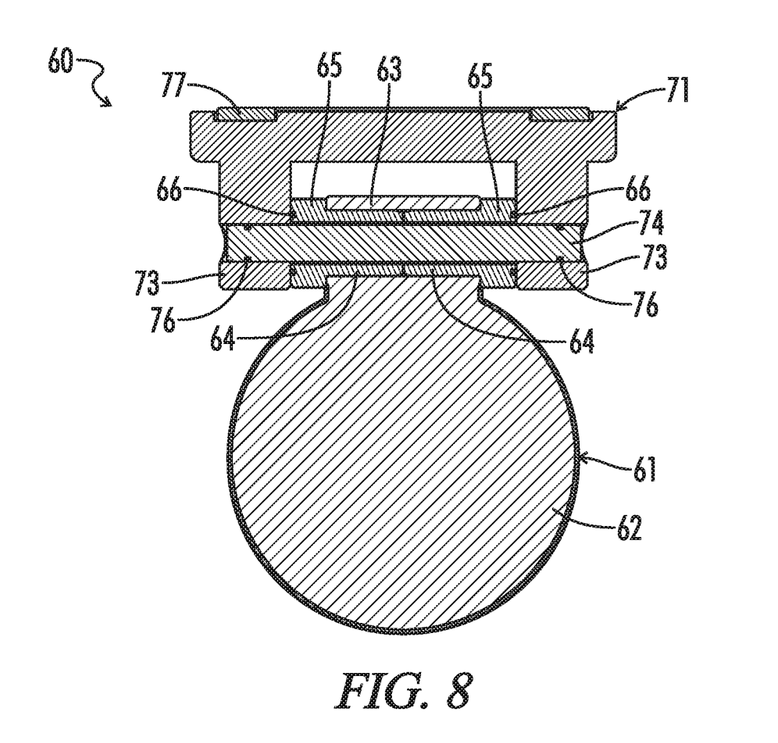
FIG. 8 is a cross-sectional view of flapper assembly 60 taken along a vertical, transverse plane extending through a pin 74 of flapper assembly 60.

Flapper assembly 60, as best seen in FIGS. 7-8, comprises a bracket 71, a flapper 61, a pair of flapper bearings 64, and a pin 74. Bracket 71 has a relatively thin, substantially annular base 72 which is provided with a pair of hinge knuckles 73. Flapper 61 is a somewhat thick, generally disc shaped closure member 62 with a knuckle 63 extending rectilinearly from one side thereof. Knuckle 63 on flapper 61, when flapper assembly 60 is assembled, extends between bracket knuckles 73.

Bearings 64 are generally open-cylindrical bodies. They have a cylindrical axial bore and an end having an enlarged outer diameter that forms a rim 65. Bearings 64 are mounted, one into each end of a cylindrical bore in flapper knuckle 63. Preferably, bearings 64 are pressure fitted into the bore with their rims 65 bottoming on flapper knuckle 63 and with minimal axial clearance between their ends. Bearings 64 provide a simple design that may be manufactured and mounted easily, but other conventional bearing designs may be used.

Pin 74 extends through cylindrical bores in bracket knuckles 73 and the axial bore in flapper bearings 64. Pin 74 and bracket 74 are locked together so that they may not rotate relative to each other. Pin 74, for example, is pressure fitted into the bores in bracket knuckles 73, but other means may be provided to lock pin 74 and bracket 71 together. Clearance is provided, however, between pin 74 and the axial bores in flapper bearings 64. Thus, flapper 61 is able to pivot about pin 74 to automatically open or close valve 20.

Seals preferably are provided to protect the clearance between flapper bearings 64 and pin 74 about which flapper 61 pivots. For example, debris seals 76 preferably are provided around pin 74 to block particulates from passing between it and the bores in bracket knuckles 73. They may be mounted, for example, in annular grooves or "glands" running around the circumference of pin 74. Debris seals 66 also are preferably provided between the facing surfaces of bracket knuckles 73 and bearings 64 to block particulates from passing through the gap between bracket knuckles 73 and bearings 64. Circular grooves, for example, may be provided around the axial bore in the seal face provided by rim 65 of bearings 64 to accommodate the O-rings.

Debris seals 76 and 66 are sized and configured such that when flapper assembly 60 is installed they are under moderate compression. Though they may be, they need not be designed to isolate pressure. Preferably, they will be designed to hold grease in the clearance and to reduce ingress of debris. Various conventional designs may be used, but more typically debris seals will be elastomeric O-rings, square cut rings, or lobed rings.

Typically, the rings will be fabricated from elastomers such as nitrile butadiene rubber (NBR), hydrogenated nitrile butadiene nitrile rubber (HNBR), fluoroelastomers such as Viton® and Dyneon™, and tetrafluoroethylene propylene rubbers, such as Aflas™, polyurethane, and fluorosilicone. The choice of materials will be driven by conventional considerations, most commonly the nature of the fluids, the temperatures, and the pressures to which the seals will be exposed. For example, fluoroelastomers may be preferred for oily and corrosive fluids, and harder nitrile and polyester rubbers may be preferred for higher pressure seals. Suitable debris seals include Viton, HNBR, and Buna O-rings available from Parker Hannifin Corp. (www.parker.com). Workers in the art will be able to select an appropriate seal and design a corresponding gland in accordance with conventional design criteria.

The clearance between bearings 64 and pin 74, about which rotation occurs, is thus protected from the ingress of particulates. Flapper assembly 60, therefore, is expected to have a much longer service life that conventional flapper assemblies. In conventional designs, fluid can carry particulates into the clearances between the pin and the knuckles on the bracket and flapper. That hinge area can experience relatively rapid wear as the flapper pivots repeatedly on the pin or the pin pivots repeatedly within the bracket knuckles. In contrast, flapper 61 pivots relative to fixed pin 74 on the clearances between pin 74 and bearings 64. That clearance can be kept clean of debris and can be packed with grease, thus reducing the rate of wear it will experience.

Figure 9:
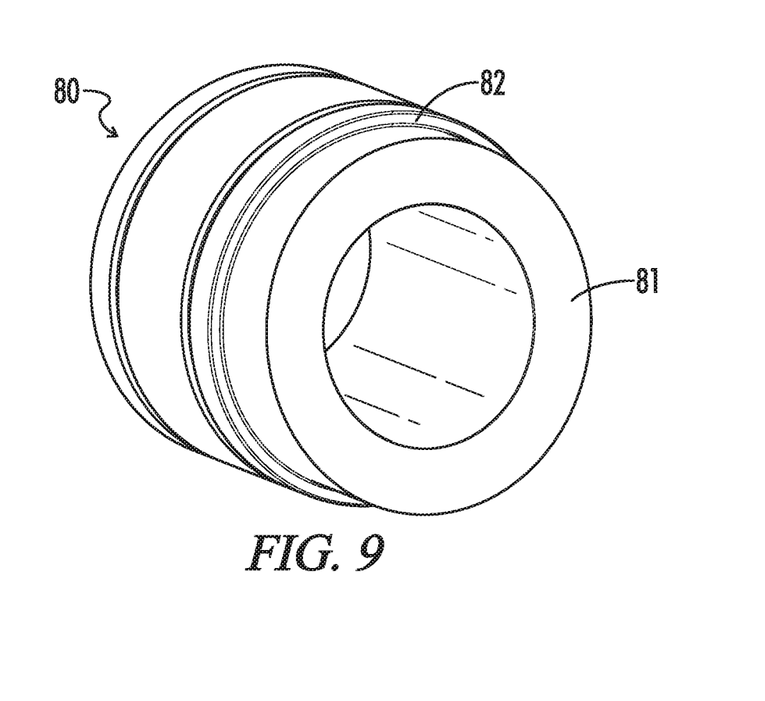
FIG. 9 is an isometric view of seat insert 80 which is mounted in flapper valve 20.

As seen best in FIG. 9, seat insert 80 is a generally open, relatively short cylindrically shaped component. The inner surface of insert 80 preferably is substantially smooth, continuous, and lacking in internal profiles. Its internal diameter, as appreciated from FIGS. 4-5, is sized to approximate the internal diameter of passage 22 as it extends through inlet sub 24 and the outlet end of outlet sub 25. The portion of passage 22 extending through inlet sub 24 and the smooth, continuous inner surface of seat insert 80 provides a relatively long conduit which will encourage more laminar flow into valve 20. The inner end of insert 80 is beveled to provide a substantially flat, angled seating surface 81.

Flapper valve 20 is designed to allow flow in only one direction: into inlet 27 and out outlet 28. It will automatically shut off back flow, i.e., flow from outlet 28 toward inlet 27. The manner in which it does so may be appreciated by first referencing, for example, FIGS. 3-6. Those figures show valve 20 as it would be oriented for assembly into a flow line. That is, service port 23 and cap 26 are on top of valve 20. Flapper 61 will hang down on pin 74 into flapper chamber 29 under the influence of gravity. The relative location of flapper pin 74 and seat insert 80 is such that seat 81 extends through and beyond the center of gravity of flapper 61. Insert 80 also is oriented such that seat 81 is normal to a vertical plane through passage 22, but at a slight angle off of vertical. Flapper closure 62, therefore, will tend to rest on seat 81.

In this "normal" or "shut" position, fluid entering outlet 28 of valve 20 will cause closure 62 of flapper 61 to bear against seat 81 of insert 80, thus shutting off back flow through valve 20. Fluid flowing into valve 20 through inlet 27, however, will cause flapper 61 to pivot up through chamber 29 toward bracket 71, allowing fluid to flow through valve 20.

Flapper assembly 60, as noted above, may be removed without any special tools and can be accessed and replaced through service port 23. Service port 23 extends vertically through the upper half of outlet sub 25 from flapper chamber 29 and opens on the top of valve body 21. The top of outlet sub 25 is beveled to provide a flat mounting surface for cap 26. Cap 26 may be viewed as having a generally short-cylindrical or disc shaped head 91 having a short annular skirt 92 extending from the lower side of head 91 into service port 23.

Cap 26 is removably mounted over service port 23 by bolts 95 extending through openings arrayed along the periphery of head 91 of cap 26, although other threaded connectors may be used. Valve body 21, for example, could be provided with threaded studs and cap 26 secured with nuts threaded onto the studs. Cap 26 and service port 23 also could be provided with mating threads, if desired, so that cap 26 may be threaded into service port 23.

One or more static pressure seals preferably are provided between skirt 92 and service port 23 to provide a leak-proof closure for service port 23. For example, pressure seals may be mounted in a groove extending around the outer surface of skirt 92 of cap 26. Pressure seals typically will be fabricated from the same type of elastomeric materials as are suitable for debris seals. Various conventional designs may be used, but more typically the pressure seals will be elastomeric O-rings, square cut rings, or lobed rings. Though they may be provided if desired, backup rings and the like typically will not be required for pressure seals. Workers in the art will be able to select an appropriate seal and design a corresponding gland in accordance with conventional design criteria.

Skirt 92 defines a blind chamber within cap 26 in which a filler body 93 is disposed. Preferably, filler 93 substantially occupies the entire volume of the blind chamber within cap 26 such that together with cap 26, there is substantially no open space above flapper assembly 60. Filler 93 also fits closely within the chamber in cap 26 so as to substantially preclude circulation of fluid in the chamber. Thus, less turbulence will be created as fluid flows through flapper valve 20.

At the same time, clearances preferably are provided between filler 93 and skirt 92 and the rest of cap 26 so that some small amounts of fluid are able to enter the clearances. The fluid will energize cap 26 and the pressure seals between skirt 92 and service port 23. Filler 93 preferably is provided with a passage to facilitate ingress of small amounts of fluids and, given the tight clearances, to facilitate insertion of filler 93 into the chamber. When assembled, filler 93 necessarily will be held securely in place, but adhesives and the like may be used to hold filler 93 in place when cap 26 is removed from valve 20.

Flapper assembly 60 is removably mounted within service port 23. For example, service port 23 is provided with a ledge or lip 75 which extends radially inward at the lower end of port 23. Base 72 of bracket 71 rests on lip 75 and is held there by cap 26. More specifically, as seen best by comparing FIGS. 4-6 and FIG. 8, a gasket ring 77 is placed between the upper surface of bracket 71 and the lower end of skirt 92 of cap 26. Gasket 77 preferably is fabricated from hard plastics, such as polypropylene, polycarbonates, and Nylon 6, Nylon 66, and other polyamides, or hard rubbers, such as butadiene rubbers and ebonite. Gasket 77 will be compressible to a degree to provide some tolerance in the extension of skirt 92 into service port 23. It will be sufficiently hard, however, that when cap 26 is bolted down on the beveled upper surface of valve body 21, gasket 77 will ensure that load is placed on bracket 71 so that it is held securely in place while flapper valve 20 is in service.

Lip 75 also defines an opening which can accommodate flapper 61 when it has pivoted up into its "open" position. The opening is rectilinear at one end and arcuate at the other. The arcuate end will closely accommodate the end of flapper 61, approximately half of the circumference of flapper 61, in its upward, open position. That will not only protect flapper 61 from erosive flow, but it will help minimize turbulence through flapper chamber 29. The opening defined by lip 75, and service port 23, however, are sized such that flapper assembly 60 may be easily installed and removed simply by removing cap 26.

Flapper assembly 60 and its components 61/64/71/74 have simple designs that allow flapper assembly 60 to perform efficiently and reliably and provide it with an extended services life. They may be mounted simply and easily in valve 20, and have other advantages discussed elsewhere herein. The invention, however, is not limited to the specific designs of flapper 61 or flapper assembly 60 illustrated herein, or the specific way in which those components are mounted within service port 23. A variety of designs are known and may be adapted for use in the novel valves.

Seat insert 80 is removably mounted in the enlarged portion of passage 22 at the inner end of outlet sub 25 and can be accessed and replaced by disassembling inlet sub 24 and outlet sub 25. More particularly, as will be appreciated from FIGS. 4-5, insert 80 may be slid into the enlarged portion of passage 22 which opens at the inlet end of outlet sub 25. A pressure seal preferably is provided between insert 80 and passage 22, for example, by mounting elastomeric O-rings and backup rings in a groove extending around the outer surface of insert 80.

As best seen in FIGS. 4-5 and 9, the outer surface of seat insert 80 has a reduced diameter inner portion which defines an inward facing shoulder 82. When inserted into passage 22, inward facing shoulder 82 on insert 80 will abut and bear on a corresponding, outward facing shoulder provided in passage 22. Annular boss 32 on inlet sub 24 will bear on the outer end of insert 80, such that insert 80 will be securely mounted in valve 20 when inlet sub 24 is assembled to outlet sub 25. In essence, insert 80 is captured between inlet sub 24 and outlet sub 25. More specifically, the enlarged outer diameter portion of insert 80 is captured between annular boss 32 and the outward facing shoulder in passage 22. Though not readily apparent in the figures, the length of annular boss 32 preferably is such that a small clearance will be maintained between the inner surface of head 31 and the inner end of outlet sub 25, thus ensuring that annular boss 32 will bear on insert 80.

Preferably, insert 80 will fit closely with passage 22, but loosely enough to allow insert 80 to be inserted and removed from passage 22 by hand and without the need for special tools. A pin 86 extending into corresponding holes in insert 80 and inlet sub 24 preferably is provided to ensure proper alignment of insert 80 with flapper 61. Other alignment means, such as keys and grooves, however, may be provided.

In the event that seat 81 on insert 80 is unacceptably compromised by erosion, inlet end 24 may be disassembled from outlet end 25 to allow replacement of seat insert 80. Insert 80 preferably will be removeable by hand without the need for special tools. If desired, however, other conventional means of mounting a seat within the inlet portion of the valve passage may be provided, such as threading an insert into, or pressure fitting it with the passage.

In general, the various components of the novel unions may be fabricated by methods and from materials commonly used in manufacturing flowline components. Given the extreme stress and the corrosive and abrasive fluids to which flowline components are exposed, especially those designed for high-pressure flow lines, suitable materials will be hard and strong. For example, excepting their seals, the components of novel pressure relieve valves may be fabricated from 4130 and 4140 chromoly steel or from somewhat harder, stronger steel such as 4130M7, high end nickel alloys, and stainless steel. The flapper assembly and seat insert preferably will be fabricated from stainless steel or the other harder steels. The components may be made by any number of conventional techniques, but typically and in large part will be made by forging, extruding, or mold casting a blank part and then machining the required features into the part.

A suitable filler body may be made of any relatively durable material. It may be made of steel, for example, but typically it will be made from less dense materials so as to reduce the overall weight of the valve. Hard plastics, such as polypropylene, polycarbonates, and Nylon 6, Nylon 66, and other polyamides, may be used. Hard rubbers, such as butadiene rubbers and ebonite also may be used. In addition, coatings or coverings may be applied to the flapper to protect it from erosion. For example, it may be provided with a rubber covering, such as carboxylated nitrile butadiene rubber (XNBR) or urethane rubber.

The novel valves also have been illustrated as assembled from various components. For example, valve body 21 is assembled from inlet sub 24 and outlet sub 25. If desired, however, additional subs may be used to assemble valve body 21, for example, to facilitate fabrication of the subs. Other embodiments may have an integral, one-piece valve body. Similarly, some embodiments may employ other conventional cap designs to removably close the service port, or they use the illustrated design without a filler body.

The novel valves also will incorporate various features of conventional valves and connections. For example, flapper valves are quite heavy and, therefore, preferably incorporate components which make it easier to handle and manipulate the valve. Service port cap 23 of valve 20, for example, has a threaded hole 96 into which a lifting eye may be threaded. The exemplified valves have been described as incorporating various seals and specific unions. Other conventional features, however, may be incorporated into the novel valves as will be readily appreciated by workers in the art having the benefit of this disclosure.

Similarly, the novel valves have been described in the context of frac systems. While frac systems in particular and the oil and gas industry in general rely on flapper valves, especially in high-pressure applications, the novel valves are not limited to such applications or industries. Likewise, they are not limited in their application to the specific, exemplified tap lines or to the mentioned pressure ratings. Suffice it to say that the novel flapper valves have wide applicability wherever flapper valves have been conventionally applied.

It also will be appreciated that the terms such as "upper," "lower," "inner," and "outer," are made with reference to the orientation in which the novel valves are will be when assembled into a flowline, for example, as illustrated in FIG. 2. The novel valves necessarily will be installed with the central passage running substantially horizontally and the flapper hanging down under the influence of gravity if the flapper is to operate as intended. Likewise, although they may be, the term "bore" is not intended to imply that the reference bore was formed by a boring process.

While this invention has been disclosed and discussed primarily in terms of specific embodiments thereof, it is not intended to be limited thereto. Other modifications and embodiments will be apparent to the worker in the art.

What is claimed is:

1. A flapper assembly for a flapper valve, said assembly comprising:
 (a) a bracket having a pair of knuckles, said bracket adapted for mounting in a flapper valve;
 (b) a flapper having a knuckle;
 (c) a bearing mounted in a bore through said flapper knuckle, said bearing comprising seal faces opposite facing surfaces on said bracket knuckles;
 (d) annular seals mounted between said bearing seal faces and said facing surfaces of said bracket knuckles; and
 (e) a pin extending through bores in said bracket knuckles and a bore in said bearing;
 (f)
 (g) wherein clearance between said bore in said bearing and said pin allows relative rotation between said flapper and said pin;
 (h) wherein said flapper is mounted to said bracket for pivoting movement between a closed position, in which said flapper is adapted to bear on a seat in said flapper valve, and an open position, in which said flapper is adapted to pivot away from said seat.

2. The flapper assembly of claim 1, wherein said bearing is sized, relative to said bore through said flapper knuckle, such that said bearing frictionally engages said bore through said flapper knuckle.

3. The flapper assembly of claim 1, wherein an annular seal is provided between said pin and said bores in said bracket knuckles.

4. The flapper assembly of claim 3, wherein said pin and said bracket are locked preventing relative rotation between said pin and said bracket.

5. The flapper assembly of claim 1, wherein said flapper assembly comprises a pair of said bearings.

6. The flapper assembly of claim 5, wherein:
 (a) each of said pair of said bearings comprise a body portion and an enlarged end providing a said bearing seal face; and
 (b) said body portions of said bearings extend into said bore in said flapper knuckle.

7. The flapper assembly of claim 1, wherein said pin and said bracket are locked preventing relative rotation between said pin and said bracket.

8. The flapper assembly of claim 7, wherein said pin is sized, relative to said bores through said bracket knuckles, such that said pin frictionally engages said bores through said bracket knuckles.

9. A flapper valve for fluid transportation systems, said flapper valve comprising:
  (a) a valve body adapted for assembly into said system,
  (b) a passage defined in said valve body adapted for conducting fluids from said system through said flapper valve;
  (c) a seat; and
  (d) the flapper assembly of claim 1, wherein said flapper is adapted for pivoting movement between a closed position, in which said flapper bears on said seat and shuts off back flow through said passage, and an open position, in which said flapper is pivoted away from said seat and allows fluid flow through said passage.

10. The flapper valve of claim 9, wherein said flapper valve comprises a service port and a cap removably closing said service port and wherein said flapper assembly is mounted in said service port.

11. A method for controlling flow through a fluid transportation system comprising a flow line, wherein said method comprises:
  (a) providing a flapper valve of claim 9 in said flow line; and
  (b) transporting fluid through said flow line.

12. A high-pressure flow line adapted for assembly into a fluid transportation system, said flow line comprising the flapper valve of claim 9.

13. A high-pressure fluid transportation system, said system comprising the flow line of claim 12.

14. The system of claim 13, wherein said system is a system for fracturing a well.

15. A flapper valve for fluid transportation systems, said flapper valve comprising:
  (a) a valve body adapted for assembly into said system, said body comprising a first sub and a second sub removably assembled to each other;
  (b) a passage defined in said valve body and extending through said first and second subs, said passage being adapted for conducting fluids from said system through said flapper valve;
  (c) a seat; and
  (d) a flapper mounted for pivoting movement between a closed position, in which said flapper bears on said seat and shuts off back flow through said passage, and an open position, in which said flapper is pivoted away from said seat and allows fluid flow through said passage;
  (e) wherein said second sub:
    i) has an outlet side adjacent to said first sub;
    ii) has a first array of holes, said holes in said first array being through holes extending through said second sub from an inlet side of said second sub to said outlet side of said second sub;
    iii) is removably assembled to said first sub by a first set of threaded connectors extending through said first array of holes into said first sub; and
    iv) has a flange union face on said inlet side, said union face:
      (1) having a flat bearing surface extending around said passage and an annular groove in said bearing surface adapted for receiving a seal; and
      (2) having a second array of holes, said holes in said second array being adapted for accommodating a second set of threaded connectors for joining said flapper valve to another flowline component by a flange union;
    v) wherein said first and second arrays of holes are concentric circular arrays.

16. The flapper valve of claim 15, wherein said second sub comprises a toroid-shaped head having a rectangular cross-section and said first array of holes extend through said head.

17. The flapper valve of claim 15, wherein said threaded connectors in said first set are bolts and said holes in said first array are countersunk on said inlet side to accommodate the heads of said bolts.

18. The flapper valve of claim 15, wherein said holes in said second array are bottomed holes and said threaded connectors in said second set are threaded studs mounted in said second array of holes.

19. The flapper valve of claim 15, wherein said first and second arrays of holes are concentric circular arrays and said first array of holes is radially outward of said second array of holes.

20. The flapper valve of claim 15, wherein said seat and said flapper are carried in said first sub of said valve body.

21. A flow line for a high-pressure fluid transportation system, said flow line comprising the flapper valve of claim 15, said flapper valve being assembled to another component of said flow line by said second set of threaded connectors extending through said second array of holes, wherein said second sub of said flapper valve and said another component are joined by a flange union.

22. The flapper valve of claim 15, wherein said flapper valve comprises an alignment pin between said first and second subs adapted for aligning said first array of holes thereby allowing insertion of said first set of threaded connectors through said first array of holes.

23. A high-pressure flow line adapted for assembly into a fluid transportation system, said flow line comprising the flapper valve of claim 15.

24. A hip-pressure fluid transportation system, said system comprising the flow line of claim 23.

25. The system of claim 24, wherein said system is a system for fracturing a well.

26. A flapper valve for a fluid transportation system, said flapper valve comprising:
  (a) a valve body adapted for assembly into said system,
  (b) a passage defined in said valve body adapted to conduct fluids from said system through said flapper valve;
  (c) a service port defined in said valve body;
  (d) a cap removably closing said service port, said cap having a head and a skirt;
    i) said skirt depending from said head and extending into said service port; and
    ii) said head having a plurality of holes adapted to accommodate threaded connectors removably assembling said cap to said valve body;
  (e) a seat;
  (f) a flapper assembly removably mounted within said service port, said flapper assembly comprising:
    i) a bracket; and
    ii) a flapper mounted to said bracket for pivoting movement between a closed position, in which said flapper bears on said seat and shuts off back flow through said passage, and an open position, in which said flapper is pivoted away from said seat and allows fluid flow through said passage; and (g) a gasket between said cap skirt and said bracket, said cap skirt bearing on said bracket through said gasket.

27. A high-pressure flow line adapted for assembly into a fluid transportation system, said flow line comprising the flapper valve of claim 26.

28. A high-pressure fluid transportation system, said system comprising the flow line of claim 27.

29. The system of claim 28, wherein said system is a system for fracturing a well.

30. A flapper assembly for a flapper valve, said assembly comprising:
(a) a bracket having a pair of knuckles, said bracket adapted for mounting in a flapper valve;
(b) a flapper having a knuckle;
(c) a bearing mounted in a bore through said flapper knuckle;
(d) a pin extending through bores in said bracket knuckles and a bore in said bearing; and
(e) an annular seal between said pin and said bores in said bracket knuckles;
(f) wherein clearance between said bore in said bearing and said pin allows relative rotation between said flapper and said pin;
(g) wherein said flapper is mounted to said bracket for pivoting movement between a closed position, in which said flapper is adapted to bear on a seat in said flapper valve, and an open position, in which said flapper is adapted to pivot away from said seat.

31. A flapper valve for fluid transportation systems, said flapper valve comprising:
(a) a valve body adapted for assembly into said system, said body comprising a first sub and a second sub removably assembled to each other;
(b) a passage defined in said valve body and extending through said first and second subs, said passage being adapted for conducting fluids from said system through said flapper valve;
(c) a seat; and
(d) a flapper mounted for pivoting movement between a closed position, in which said flapper bears on said seat and shuts off back flow through said passage, and an open position, in which said flapper is pivoted away from said seat and allows fluid flow through said passage;
(e) wherein said second sub:
i) has an outlet side adjacent to said first sub;
ii) has a first array of holes, said holes in said first array being through holes extending through said second sub from an inlet side of said second sub to said outlet side of said second sub;
iii) is removably assembled to said first sub by a first set of threaded connectors extending through said first array of holes into said first sub and wherein said threaded connectors in said first set are bolts and said holes in said first array are countersunk on said inlet side to accommodate the heads of said bolts; and
iv) has a flange union face on said inlet side, said union face:
(1) having a flat bearing surface extending around said passage and an annular groove in said bearing surface adapted for receiving a seal; and
(f) having a second array of holes, said holes in said second array being adapted for accommodating a second set of threaded connectors for joining said flapper valve to another flowline component by a flange union.

32. A flapper valve for fluid transportation systems, said flapper valve comprising:
(a) a valve body adapted for assembly into said system, said body comprising a first sub and a second sub removably assembled to each other;
(b) a passage defined in said valve body and extending through said first and second subs, said passage being adapted for conducting fluids from said system through said flapper valve;
(c) a seat; and
(d) a flapper mounted for pivoting movement between a closed position, in which said flapper bears on said seat and shuts off back flow through said passage, and an open position, in which said flapper is pivoted away from said seat and allows fluid flow through said passage;
(e) wherein said second sub:
i) has an outlet side adjacent to said first sub;
ii) has a first array of holes, said holes in said first array being through holes extending through said second sub from an inlet side of said second sub to said outlet side of said second sub;
iii) is removably assembled to said first sub by a first set of threaded connectors extending through said first array of holes into said first sub; and
iv) has a flange union face on said inlet side, said union face:
(1) having a flat bearing surface extending around said passage and an annular groove in said bearing surface adapted for receiving a seal; and
(f) having a second array of holes, said holes in said second array being bottomed holes in which are mounted threaded studs, said threaded studs providing a second set of threaded connectors for joining said flapper valve to another flowline component by a flange union.

\* \* \* \* \*

UNITED STATES PATENT AND TRADEMARK OFFICE
CERTIFICATE OF CORRECTION

PATENT NO. : 11,098,821 B1
APPLICATION NO. : 16/598388
DATED : August 24, 2021
INVENTOR(S) : Duy D. Nguyen Page 1 of 1

It is certified that error appears in the above-identified patent and that said Letters Patent is hereby corrected as shown below:

In the Claims

In Claim 1, at Column 16, Line 38, delete "(f)".

In Claim 1, at Column 16, Line 39, delete "(g)" and insert therein -- (f) --.

In Claim 1, at Column 16, Line 42, delete "(h)" and insert therein -- (g) --.

In Claim 24, at Column 18, Line 40, delete "hip-pressure" and insert therein -- high-pressure --.

In Claim 31, at Column 20, Line 10, delete "(f)" and insert therein -- (2) --.

In Claim 32, at Column 20, Line 46, delete "(f)" and insert therein -- (2) --.

Signed and Sealed this
Twenty-first Day of September, 2021

Drew Hirshfeld
*Performing the Functions and Duties of the
Under Secretary of Commerce for Intellectual Property and
Director of the United States Patent and Trademark Office*